May 11, 1965 W. M. HARKS 3,182,505
LIQUID LEVEL INDICATOR
Filed March 28, 1963 2 Sheets-Sheet 1

INVENTOR.
WALTER M. HARKS
BY Joseph F. Cole
ATTORNEY

May 11, 1965

W. M. HARKS 3,182,505

LIQUID LEVEL INDICATOR

Filed March 28, 1963

INVENTOR.
WALTER M. HARKS
BY Joseph F. Cole
ATTORNEY

United States Patent Office 3,182,505
Patented May 11, 1965

3,182,505
LIQUID LEVEL INDICATOR
Walter M. Harks, 210 Eucalyptus Ave.,
South San Francisco, Calif.
Filed Mar. 28, 1963, Ser. No. 268,717
7 Claims. (Cl. 73—307)

The present invention relates to improvements in a liquid level indicator. It consists of the combinations, constructions, and arrangement of parts, as hereinafter described and claimed.

It is a well known fact that water pressures in various communities differ from one another, and that the prevailing water pressure will fluctuate during times of the day and night. Accordingly, it is difficult to estimate the amount of water which is being delivered to lawns, gardens, and the like. While some attempt has been made to water in accordance with periods of time that are considered ample, this procedure is not accurate due to fluctuating of the water pressure.

An object of this invention is to provide a liquid level indicator, which may be placed on lawns or in gardens, so as to collect water as it is sprinkled or otherwise delivered to the lawns, plants, shrubbery, etc. This liquid level indicator is provided with a visual signal which may be readily set to give a warning after a predetermined amount of water has been delivered by sprinklers and the like, irrespective of the prevailing water pressure and time period required.

Another object of the invention is to provide a liquid level indicator which may be easily adjusted so as to indicate a predetermined amount of water that will be delivered before the warning signal is given. Thus, the indicator may be set for the equivalent of one-fourth inch of rain, one-half inch of rain, etc.

It is further proposed to provide a device of the type described that is simple in construction, durable and efficient for the purpose intended, and which may be manufactured at a relatively low cost.

Other objects and advantages will appear as the specification continues. The novel features of the invention will be set forth in the appended claims.

*Drawings*

For a better understanding of the invention, reference should be had to the accompanying drawings, forming part of this specification, in which:

FIGURE 1 is top plan view of the water level indicator; and

FIGURES 2 and 3 are vertical sectional views taken along the planes 2—2 and 3—3, respectively, of FIGURE 1.

While I have shown only one embodiment of the invention, it should be understood that various changes, or modifications, may be made within the scope of the annexed claims without departing from the spirit thereof.

*Detailed description*

Figure 1:
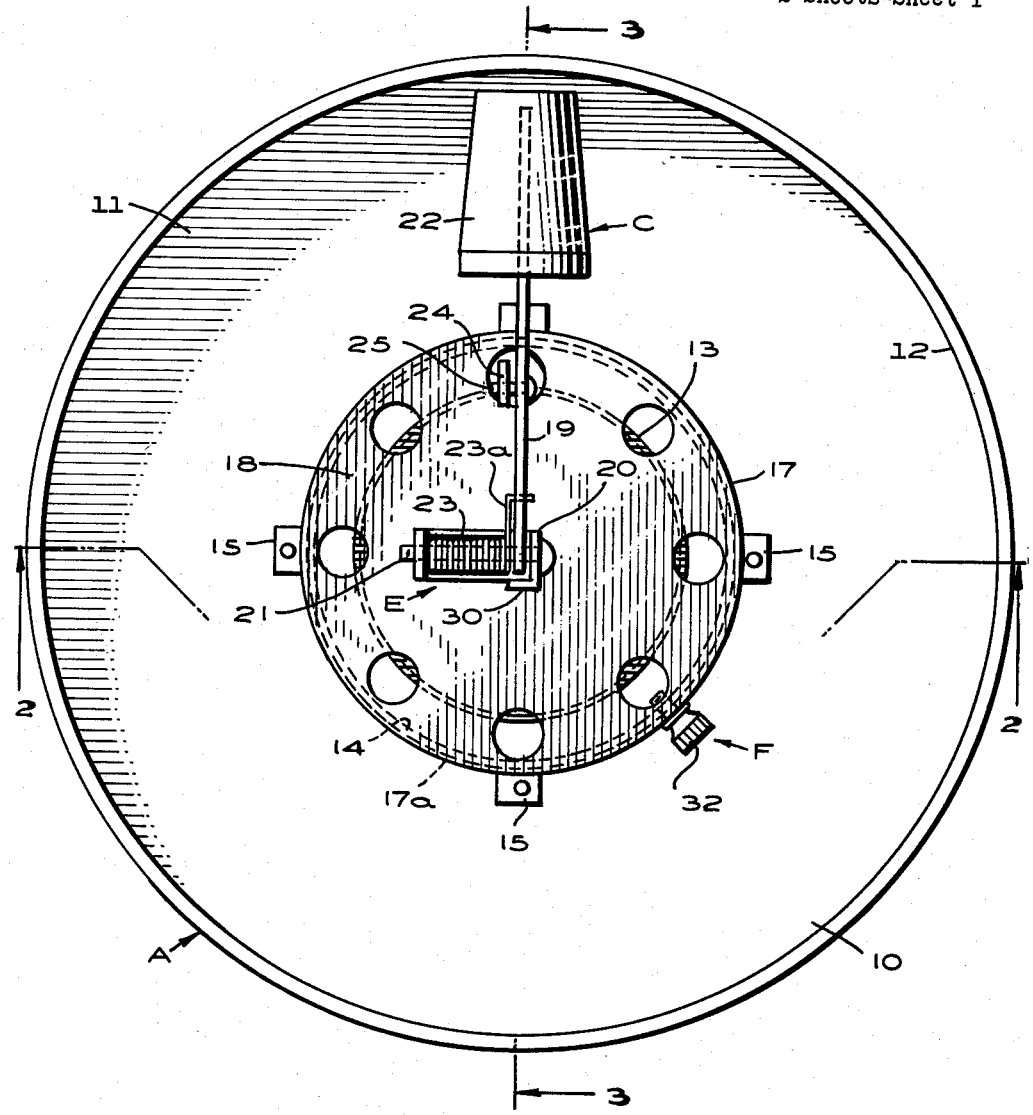

Referring now to the drawings in detail, it will be noted that I provide a liquid-collecting basin designated generally at A and adapted to hold liquid B to various depths. This basin may be placed in an area where water is being sprinkled over a lawn, for instance, and the basin has an open top 10 through which the water may descend into the basin and be collected by the latter.

Figure 2:
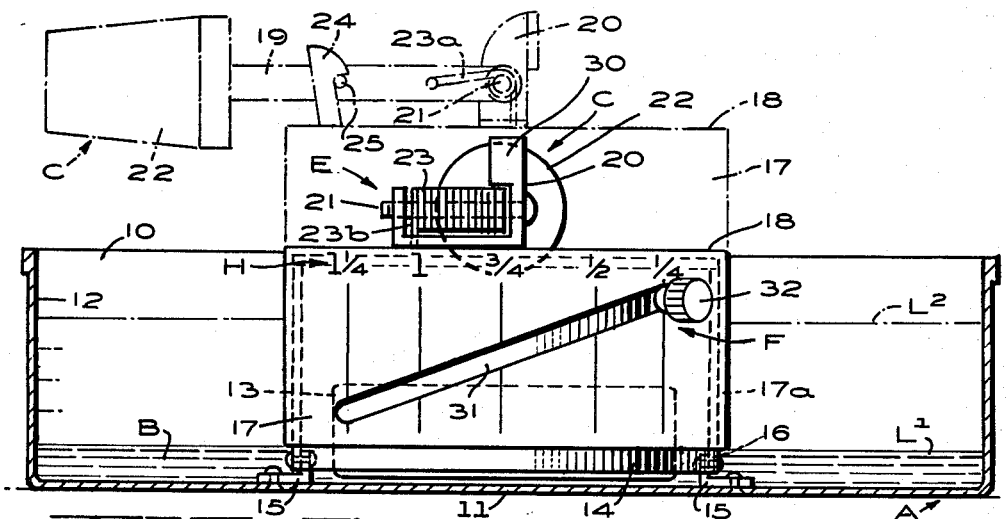
Figure 3:
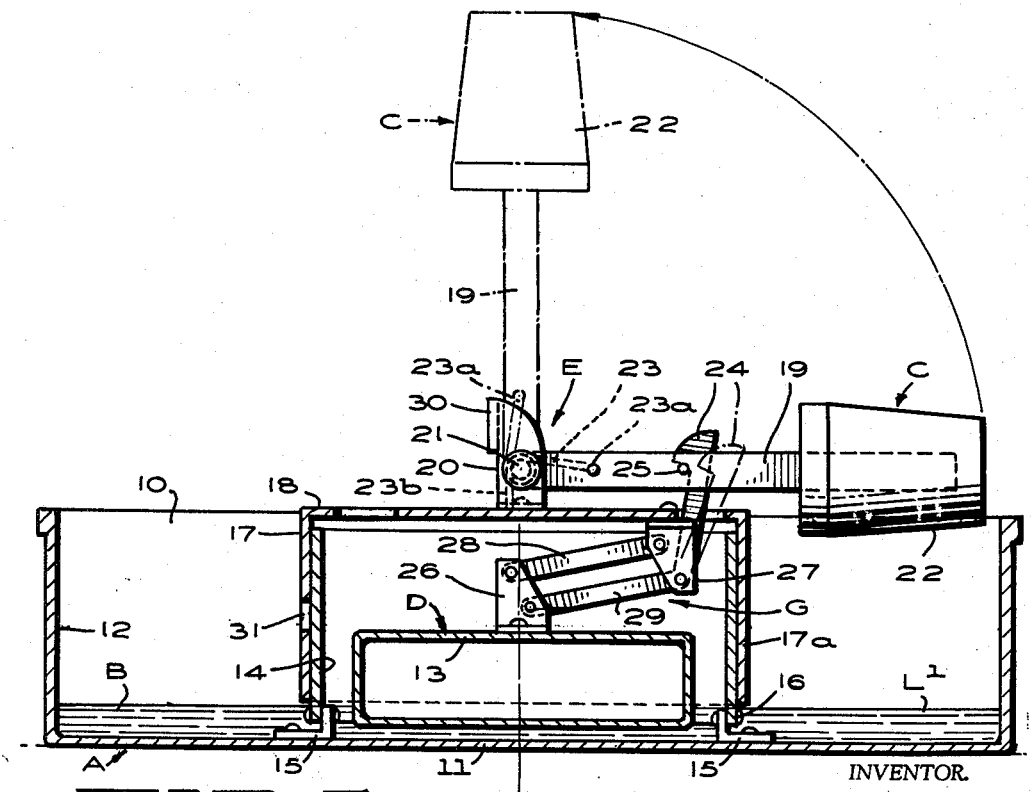

As shown in FIGURES 2 and 3, the basin A has a bottom wall 11 and a surrounding upstanding wall 12 of uniform diameter. This arrangement will facilitate the determination of the exact amount of water B that has been collected by the basin. Thus, if it is desired to deliver one-quarter of inch of water to a lawn, the depth of the water in the basin will rise to the level indicated by L¹ in FIGURES 2 and 3, the depth of the water being one-quater of an inch.

In its structural features, the liquid level indicator includes a visual signal C that is associated with the basin A and supported for movement between a lowered non-signalling position (see full line position in FIGURE 3) and a raised telltale signalling position (see dot-dash position in FIGURE 3). Float-controlled means D is engageable with the signal C for releasably holding the signal in its lowered non-signalling position, and including a buoyant float 13 disposed to be elevated by the water or liquid B as the depth of the latter in the basin increases. Signal-moving means E are operable for carrying the visual signal C into raised signalling position, when the signal is released. Moreover, adjustable means F are provided for regulating the depth of the liquid B at which the float-controlled means D will respond to release the signal. The details of these parts will be described as the specification proceeds.

It will be noted that a tubular guide 14 is anchored to the basin A to extend upwardly from the bottom 11 of the basin. For this purpose, a plurality of angle feet 15 are fastened to the lower section of the tubular guide 14 and the bottom wall 11 of the basin, with the lower rim 16 of the guide being spaced above the bottom of the basin, whereby the liquid B may enter the interior of the tubular guide 14 to raise the float 13.

The adjustable means F includes an inverted cup-shaped member 17 telescoping relative to the tubular guide 14 for vertical adjustment. The visual signal C is supported by the bottom wall 18 of the cup-shaped member 17. For this purpose, the signal C has a stem 19 having its inner end swingably secured to a bracket 20 by a journal pin 21, this bracket being fastened to the wall 18 of the cup-shaped member 17.

In order to attract the attention of an attendant, the visual signal C is provided with a knob 22 at the outer end of the stem 19. This knob may be suitably colored. It will be clear from FIGURE 3 that the stem 19 and its knob 22 may be swung into substantially horizontal position, as shown by full lines in this view, at which time the signal C will occupy a non-signalling position. Also, the signal C may be raised into a telltale signalling position, as shown by dot-dash lines in FIGURE 3, at which time the stem 19 and its knob 22 will be disposed substantially in an upright position.

The signal-moving means E is provided by a coil spring 23 of the tension type, which has its intermediate portion coiled around the journal pin 21. One end 23a of this spring is anchored to the stem 19 and its other end 23b is anchored to the bracket 20. The spring 23 is biased to raise the signal C, when the latter is released by the float-controlled means D.

In order to releasably hold the signal C in its lowered non-signalling position, as shown by full lines in FIGURE 3, a latching catch 24 is provided. This catch engages with a pin 25 that is fixed to and projects from the stem 19. When the catch 24 is withdrawn from the pin 25, the spring 23 will automatically raise the signal C into its telltale position (dot-dash lines in FIGURE 3).

For the purpose of releasing the latching catch 24 from the signal C, when the depth of the liquid B in the basin A reaches a predetermined level, I provide a parallelogram linkage G (see FIGURE 3). This linkage is formed by a lower bracket 26 which is fixed to the buoyant float 13, an upper bracket 27 that is secured to the bottom wall 18 of the cup-shaped member 17, and links 28 and 29. As clearly disclosed in FIGURE 3, the opposite ends of these links are swingably attached to the brackets 26 and 27, respectively. The latching catch 24 is fashioned as an extension of the link 29.

The parallelogram linkage G is operable for holding the float 13 against tilting as the float rises and falls with the liquid B in the basin A. Assuming that it is desired to release the signal C, when the depth of the liquid in the basin reaches the level $L^1$ in FIGURE 3, the parallelogram linkage G will retract the latching catch 24 from the pin 25 at this time. Thereupon, the spring 23 will raise the signal C until its stem 19 comes to rest against a stop 30 formed on the bracket 20.

As previously mentioned, if the level $L^1$ represents one-quarter of an inch of liquid B in the basin, the attendant will know that this amount of water has been delivered to the lawn or other area in which the basin A has been placed for collecting the water.

In order to vary the level of the liquid B in the basin A at which the signal C will be released for upward movement into a telltale position, the depending wall 17a of the cup-shaped member 17 has an inclined slot 31 fashioned therein (see FIGURE 2). A clamping screw 32, or the like, is anchored to the tubular guide 14 and extends through this inclined slot, whereby the cup-shaped member 17 may be adjusted vertically by rotating it relative to the tubular guide, while the clamping screw is loosened and remains extending through the inclined slot.

A graduated scale H is provided on the cup-shaped member 17 (see FIGURE 2), with the graduations increasing circumferentially thereof, and the graduations indicating the depth of the liquid B in the basin A at which the signal C will be released. As shown in FIGURE 2, the cup-shaped member 17, when adjusted vertically, will carry the signal C and the latching catch 24 therewith, an elevated position of the cup-shaped member being illustrated by dot-dash lines in FIGURE 2. By way of illustration, I have shown the graduated scale as having markings ¼, ½, ¾, 1 and 1¼, and these markings indicate the depth to which the liquid B must collect in the basin A before the signal C will be released. The markings represent fractions of inches of liquid collected in the basin, or in other words, the equivalent of corresponding amount of rain.

By providing the slot 31 on an incline, rather than vertical, the graduations on the scale H may be spread apart further and the scale may be read more easily.

After the cup-shaped member 17 has been adjusted vertically so as to bring the desired graduation next to the screw 32 (which serves as a reference point), the screw 32 should be tightened so as to hold the cup-shaped member 17 in place relative to the guide 14. Both the member 17 and the guide 14 are cylindrical so that the former may be rotated with respect to the latter.

In the event that the attendant should desire to have one and one-quarter inches of water delivered to a lawn, for example, then the cup-shaped member 17 should be rotated until the marking "1¼" registers with the screw 32 and then the latter should be tightened. This will elevate the member 17 and the signal C to the position shown by dot-dash lines in FIGURE 2. When the water collected in the basin A reaches the level $L^2$, the signal C will be released from the float-controlled means D, and the signal will be raised into its telltale position. Of course, any desired number of graduations may be provided on the scale H, with higher and lower numbers being utilized to meet requirements.

I claim:
1. In a liquid level indicator:
   (a) a liquid-collecting basin adapted to hold liquid to various depths;
   (b) a tubular guide anchored to the basin and extending upwardly relative to a bottom of the basin;
   (c) an adjustable inverted cup-shaped member telescoping relative to the tubular guide for vertical adjustment;
   (d) a visual signal associated with the basin and being supported by a bottom of the cup-shaped member for movement between a lowered non-signalling position and a raised telltale signalling position;
   (e) a buoyant float disposed to be elevated by the liquid as the depth of the latter in the basin increases;
   (f) a latching catch attached to the bottom of the cup-shaped member for releasably engaging with the signal for holding the signal in its lowered non-signalling position;
   (g) and means actuated by the float for releasing the latching catch from the signal, when the depth of the liquid in the basin reaches a predetermined level;
   (h) the cup-shaped member, when adjusted vertically, carrying the signal and latching catch therewith, and determining the level of the liquid in the basin at which the signal will be released.
2. The liquid level indicator, as set forth in claim 1;
   (i) and in which the inverted cup-shaped member has a depending wall surrounding the tubular guide, and this wall having an inclined slot fashioned therein;
   (j) and a clamping screw, or the like, anchored to the tubular guide and extending through the inclined slot of the cup-shaped member, whereby the cup-shaped member may be adjusted vertically by rotating it relative to the tubular guide, while the clamping screw is loosened and remains extending through the inclined slot.
3. The liquid level indicator, as set forth in claim 2;
   (k) and in which a graduated scale is provided on the cup-shaped member, with the graduations increasing circumferentially thereof, and the graduations indicating the depth of the liquid in the basin at which the signal will be released.
4. The liquid level indicator, as set forth in claim 1;
   (i) and in which the means actuated by the float for releasing the latching catch from the signal includes an parallelogram linkage operable to hold the float against tilting as the float rises and falls with the liquid in the basin.
5. The liquid level indicator, as set forth in claim 4;
   (j) and in which the float and the parallelogram linkage are disposed within the interior of the tubular guide.
6. The liquid level indicator, as set forth in claim 5;
   (k) and in which the tubular guide has a lower rim spaced above the bottom of the basin, whereby liquid may enter the interior of the tubular guide from the basin to raise the float.
7. The liquid level indicator, as set forth in claim 4;
   (j) and in which the latching catch is fashioned as an extension of a link forming part of the parallelogram linkage.

References Cited by the Examiner
UNITED STATES PATENTS

| | | | |
|---|---|---|---|
| 1,141,500 | 6/15 | Stahle | 73—317 |
| 1,458,663 | 6/23 | Morley | 116—110 |
| 2,594,885 | 4/52 | Due | 116—118 |
| 2,718,784 | 9/55 | Brake | 73—317 |

ISAAC LISANN, *Primary Examiner.*